United States Patent [19]
Charter

[11] 3,851,570
[45] Dec. 3, 1974

[54] APPARATUS FOR MAKING A MARBLED MEAT PET FOOD

[75] Inventor: Wayne M. Charter, Crystal Lake, Ill.

[73] Assignee: The Quaker Oats Company, Chicago, Ill.

[22] Filed: Mar. 1, 1972

[21] Appl. No.: 231,054

Related U.S. Application Data

[62] Division of Ser. No. 57,092, July 22, 1970, Pat. No. 3,765,902.

[52] U.S. Cl. .............................. 99/450.2, 426/249
[51] Int. Cl. ............................................ A21c 3/06
[58] Field of Search ............ 99/450.1, 450.2, 450.7, 99/109, 7, 108; 259/4, 18; 426/249

[56] References Cited
UNITED STATES PATENTS

| | | | |
|---|---|---|---|
| 2,879,163 | 3/1959 | Anson | 99/109 |
| 3,277,846 | 10/1966 | Kesselman | 99/450.2 |
| 3,370,553 | 2/1968 | Rich | 99/450.2 |
| 3,380,832 | 4/1968 | Palatine | 99/7 |

Primary Examiner—Robert W. Jenkins
Attorney, Agent, or Firm—Donnie Rudd

[57] ABSTRACT

An apparatus is described for producing a substantially solid semi-moist animal food resembling marbled meat. The apparatus consists of a pipe closed at one end and having a number of holes immediately adjacent to the closed end. A second pipe completely encloses the first pipe.

1 Claim, 3 Drawing Figures

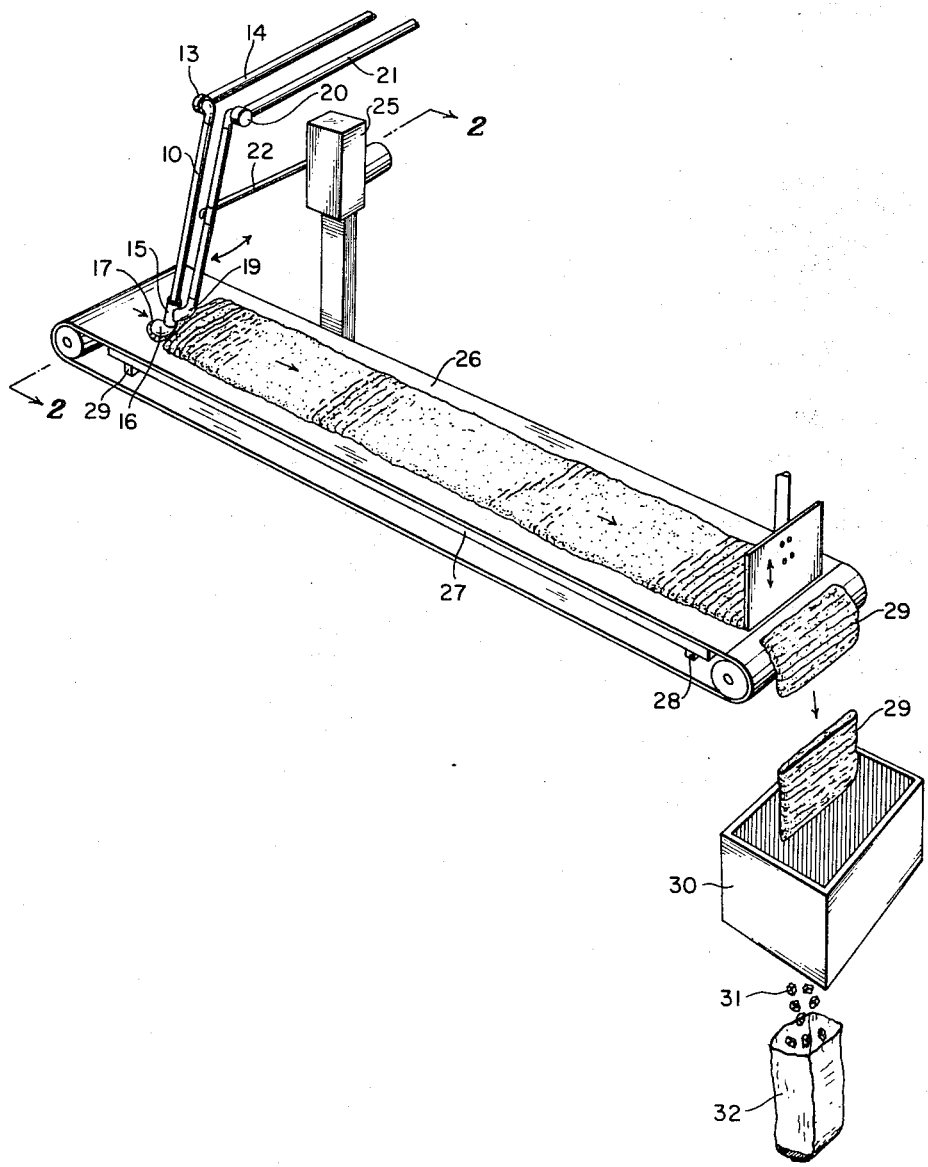

PATENTED DEC 3 1974

INVENTOR:
WAYNE M. CHARTER

BY Donnie Rudd

ATTORNEY

APPARATUS FOR MAKING A MARBLED MEAT PET FOOD

This is a division of application Ser. No. 57,092, filed July 20, 1970, now Pat. No. 3,765,902.

BACKGROUND OF THE INVENTION

1. Field of the Invention

This invention relates to a substantially solid semi-moist meaty pet food having an appearance and texture similar to raw meat which is marbled throughout with fat.

2. Description of the Prior Art

Only one product of the semi-moist type is known to exist which resembles raw meat being marbled throughout with fat. This product and the process for making it are thoroughly described in U.S. Pat. No. 3,380,832, issued to David P. Bone. This process, however suffers from the disadvantage of requiring excessive personnel attention; consequently, the process is costly. The present process produces an equal or superior product to the known process with a substantial reduction in the labor force. This process utilizes a completely new apparatus to accomplish the desired result.

SUMMARY OF THE INVENTION

It is an object of this invention to provide a new apparatus for producing marbled meat semi-moist pet food.

The object of this invention is accomplished by a new and novel apparatus and use thereof. Basically the new apparatus consists of a pipe having an intake end and being closed at the opposing end. Immediately adjacent to the closed end is a plurality of small openings. A larger pipe completely surrounds the first pipe and extends below the closed end of the first pipe. One color of material is extruded into the first pipe. A second color of material is extruded into the second pipe. The material in the inner pipe is extruded as a plurality of small strands into the material in the outer pipe. This entire mass is then extruded onto a moving conveyor in a back and forth motion.

More particularly the apparatus of this invention comprises a first pipe, said first pipe having an entrance end and an outlet end, said outlet end of said first pipe being substantially closed and said first pipe having a plurality of openings adjacent to the substantially closed outlet end, the area of opening of each of the plurality of openings being smaller than the cross-sectional area of the interior of the first pipe, a second pipe, said second pipe having a discharge port, entrance end, and inner cavity, said inner cavity of said second pipe completely enclosing said outlet end of said first pipe with said outlet end of said first pipe being substantially within said inner cavity, said entrance end of said second pipe being sealed to said entrance end of said first pipe to form a continuous sealed cavity from said entrance of said second pipe to said inner cavity; means for supplying the first pipe and the second pipe with different colored semi-moist animal food, said means being respectively connected to the entrance end of each pipe; an endless conveyor for receiving and cooling a product, said endless conveyor being located underneath said discharge port of said second pipe; and means for moving said first pipe and said second pipe back and forth across the endless conveyor.

The process of this invention may be further defined as a process comprising the steps:

a. forming by a cooking-extrusion process a first mass of unexpanded storage stable semi-moist animal food having the appearance of lean red meat and having incorporated therein a caseinate-salt adhesive in an amount sufficient to provide stickiness at temperatures above 120° F., said amount being between 7.5 percent and 25 percent by weight based on the weight of the first mass;

b. forming by a cooking-extrusion process a second mass of unexpanded storage stable semi-moist animal food having the appearance of fat;

c. extruding a plurality of small strands of one of the masses of unexpanded material into the other of the masses of the unexpanded material to form a meat-like mass; and d. extruding the meat-like mass in a moving motion onto a moving conveyor.

The pet food materials of this invention follow known formulations of semi-moist pet foods. Generally, the formulation of a pet food to provide storage stability is within the purview of one skilled in the art. In the practice of this invention a preferred formulation with respect to storage stability is one in which the water activity of the product is less than 0.90 and also contains an effective amount of mold inhibitor, such as sorbic acid or its salts. Water activity ($a_w$) as used herein is defined as follows:

$$a_w = f/fo$$

where:

$f$=fugacity of water vapor in the specified system $fo$=fugacity of pure water at the specified system temperature and 1 atmosphere total pressure.

Fugacity is a well known physical-chemical term adequately defined in any appropriate text, such as Physical chemistry, Prutton and Maron (1949) p. 318. As is apparent to those skilled in the art, water activity in the desired range is achieved by including appropriate quantities of soluble materials such as sugars and glycols in the formulation.

I have found that formulations such as those listed in the numbered examples following using sugar in an amount between about 15 and 30 percent and propylene glycol in an amount between about 2 and about 10 percent and sorbic acid or its salts in amounts from 0.06 to 0.3 percent provide adequate storage stability for the products of this invention which contain moisture in an amount between about 20 percent and about 40 percent by weight based on the weight of the product.

The extrusion conditions in the method of this invention are such that the ingredients are cooked; preferably temperatures between 190° and 300° F. are used in the extruder with the pressure in the extruder being sufficient to prevent substantial expansion of the resulting plastic mass in the extruder. The use of starch-containing ingredients, such as cereals or cereal functions such as starch, are not essential to the practice of this invention in its broadest aspects. It is nonetheless preferred that the ingredients contain at least one-half of 1 percent starch. While meaty pet foods produced in accordance with this invention which are devoid of starch have the necessary appearance and texture of marbled meat, they do not have a preferred degree of structural stability at elevated storage temperatures, i.e., above 120° F., e.g. 130° F. to 135° F. Including starch in an amount greater than one-half of 1 percent in the ingredients prior to cooking provides a product which is structurally stable to an eminently satisfactory degree under storage conditions at 135° F., provided temperatures in excess of about 230° F. are achieved in the extruders, during the manufacture of the product.

As used herein, the term "meaty" indicates that a substantial portion of the ingredient list is made up of meat or meat by-products. The term "meat" is understood to apply to the flesh of cattle, swine, sheep, goats, horses, whale and other mammals, poultry and fish. The term "meat by-products" includes such constituents as are embraced by that term in the definitions of feed ingredients published by the Association of American Feed Control Officials Incorporated.

This invention has the particular advantage of minimum attention by personnel. Once the process is set in motion, it can be fully automated from raw materials to packaged product without the necessity of human handling. This process is, therefore, a new and unique improvement in the art of producing marbled meat pet foods.

BRIEF DESCRIPTION OF THE DRAWINGS

This invention may be more fully described but is not limited by the enclosed drawings wherein;

FIG. 1 is a perspective view of the apparatus of this invention as it is used in the process of this invention;

FIG. 2 is a cross-sectional view of the apparatus taken along line 2—2 of FIG. 1; and FIG. 3 is an illustration of the interior of the extruding head of the apparatus of this invention.

In the drawings, I have used the numeral 10 to refer to the inner or first pipe. The first pipe 10 is closed at one end 11 and has a plurality of holes 12 immediately adjacent to the closed end. The inner pipe 10 is connected on the opposite end from the closed end by a swivel joint 13 which is connected to an extruder supply line 14. The first pipe is completely enclosed at its exit end by a second pipe 15. The second pipe 15 extends below the end of the first pipe and preferably curves horizontally as is shown at point 16. The horizontal curve in the pipe may be either opposing the movement of the endless conveyor 26 as is shown or turned to deposit the extrudate in the direction of movement of the endless conveyor 26. The second pipe has a discharge as is illustrated at point 17. The second pipe is sealed around the first pipe at a contact point 18 which is above the discharge end of the first pipe. The second pipe is connected by an entrance supply connection 19 which is in turn connected to a second extrusion supply line 21. The extruding head apparatus is moved in a back and forth motion by a suitable connection 22 which is supplied by a back and forth movement from a cam or the like such as mechanism 23. Mechanism 23 is in turn rotated on shaft 24 by motor 25. The connection of arm 22 to pipe 19 is through a movable connection attachment 25 which can be altered to give the proper stroke to the extrusion head.

In operation pipes 14 and 21 supply suitable amounts of different color material preferably one red and the other white. The extrusion head is set in motion and the materials are extruded through the apparatus exiting from opening 17. Endless conveyor 26 is set in motion to receive the material. The endless conveyor 26 is cooled by a cooling table 27 which is supplied by cooling water at entrance port 28 with the cooling water being removed at discharge port 29. As the extruded material which resembles marbled meat is deposited on the endless conveyor, it adheres to itself and cools as it moves along. After the material is suitably cooled to a degree at which the material no longer sticks to itself, the long sheet of material is cut into small lengths 29 wherein it is then passed to a suitable dicing machine 30 to be cut into even smaller parts 31 and then packaged, illustrated by package 32. Any suitable dicing machine may be used for this function but one illustration of such a machine is the one found in U.S. Pat. 2,690,011. It may thus be seen that this apparatus and process are new and unique in the production of a marbled met pet food.

DESCRIPTION OF THE PREFERRED EMBODIMENTS

Example 1

This example illustrates the manufacture of a beefy-like marbled meaty pet food which does not melt at 135° F. The ingredients making up the meat portion and the ingredients making up the fat portion where thoroughly mixed in separate blenders in the proportion indicated in Table 1.

Table 1

|  | MEAT | FAT | TOTAL FORMULA |
|---|---|---|---|
| Beef Tripe | 29.0000 | 42.50 | 32.3750 |
| Sugar, Ready Mix Grade | 26.5778 | 26.50 | 26.5584 |
| Sodium Caseinate | 15.0000 | 15.00 | 15.0000 |
| Beef Trimmings, 40% Lean | 13.5000 | — | 10.1250 |
| Corn Starch | 7.5000 | 7.50 | 7.5000 |
| Propylene Glycol | 4.5000 | 4.50 | 4.5000 |
| Dicalcium Phosphate, Dihydrate | 2.5000 | 2.50 | 2.5000 |
| Salt, Iodized | 1.2000 | 1.20 | 1.2000 |
| Potassium Sorbate | 0.1000 | 0.10 | 0.1000 |
| Vitamin E. Supplement (20,000 IU/lb.) | 0.0670 | — | 0.0503 |
| Titanium Dioxide | — | 0.20 | 0.0500 |
| Riboflavin Supplement (4 g./lb) | 0.0270 | — | 0.0202 |
| Vitamin A Supplement (30,000 IU/lb.) | 0.0178 | — | 0.0134 |
| Irradiated Dried Yeast | 0.0040 | — | 0.0030 |
| FD & C Red No. 2 | 0.0027 | — | 0.0020 |
| FD & C Yellow No. 6 | 0.0027 | — | 0.0020 |
| Thiamine Mononitrate | 0.0010 | — | 0.0007 |
| Total | 100.0000 | 100.0000 | 100.0000 |

The material referred to as meat in Table 1 supplies the base material of the product while the material referred to as fat in Table 1 gives the marbled appearance to the meat. The meat ingredients and the fat ingredients were mixed separately and the resulting mixtures were charged to separate extruders at such a rate that the weight ratio of meat extrudate to fat extrudate was approximately 4 to 1. The conditions in the two extruders were substantially identical. The extruders were steam jacketed and the combination of friction and externally applied steam heat resulted in the achievement of peak temperatures in the range of approximately 260° F. to 275° F. The pressures utilized were adequate to prevent substantial expansion of the plastic mass within the extruder. The red portion or meat portion was supplied to the outer pipe 15 as shown in the drawings. The white portion, or fat portion, was supplied to the inner pipe 10 as shown in the drawings. The apparatus was set in motion and the extruded product had the appearance of raw meat marbled throughout with fat. After sufficient cooling on the continuous conveyor, the product was cut into small sheets and then cut into small chunks by a dicing machine and thereafter packaged. The product was found to have very high appeal when fed to dogs and had a very good appearance and was low in cost.

This invention is a significant advance in the art of pet food production. The process is much more simple than any known prior process. This is achieved by the new and novel apparatus claimed as this invention. The result of this invention is that a minimum of human control is needed in the process and the process can be fully automated. This illustrates the significant advance made by this invention.

Having fully described this new and unique invention, I claim:

1. An apparatus for producing a substantially solid semi-moist animal food resembling marbled meat, said apparatus comprising a first pipe, said first pipe having an entrance end and an outlet end, said outlet end of said first pipe being substantially closed and said first pipe having a plurality of openings adjacent to the substantially closed outlet end, the area of opening of each of the plurality of openings being smaller than the cross-sectional area of the interior of the first pipe, a second pipe, said second pipe having a discharge port, entrance end and inner cavity, said inner cavity of said second pipe completely enclosing said outlet end of said first pipe with said outlet end of said first pipe being substantially within said inner cavity, said entrance end of said second pipe being sealed to said entrance end of said first pipe to form a continuous sealed cavity from said entrance of said second pipe to said inner cavity; means for supplying the first pipe and the second pipe with different colored semi-moist animal food, said means being respectively connected to the entrance end of each pipe; an endless conveyor for receiving and cooling a product, said endless conveyor being located underneath said discharge port of said second pipe; and means for moving said first pipe and said second pipe back and forth across the endless conveyor.

* * * * *